US008842291B2

(12) United States Patent
Turner et al.

(10) Patent No.: US 8,842,291 B2
(45) Date of Patent: Sep. 23, 2014

(54) INTERFEROMETRIC QUASI-AUTOCOLLIMATOR

(75) Inventors: Matthew D. Turner, Seattle, WA (US); Jens H. Gundlach, Seattle, WA (US); Charles A. Hagedorn, Seattle, WA (US); Stephan Schlamminger, Rockville, MD (US)

(73) Assignee: University of Washington Through Its Center for Commercialization, Seattle, WA (US)

( * ) Notice: Subject to any disclaimer, the term of this patent is extended or adjusted under 35 U.S.C. 154(b) by 367 days.

(21) Appl. No.: 13/426,309

(22) Filed: Mar. 21, 2012

(65) Prior Publication Data

US 2012/0242999 A1 Sep. 27, 2012

Related U.S. Application Data

(60) Provisional application No. 61/454,915, filed on Mar. 21, 2011.

(51) Int. Cl.
*G01B 9/02* (2006.01)
*G02B 27/62* (2006.01)
*G02B 27/10* (2006.01)

(52) U.S. Cl.
CPC ............... *G02B 27/62* (2013.01); *G02B 27/10* (2013.01); *G01B 2290/70* (2013.01); *G01B 9/02057* (2013.01); *G01B 9/02032* (2013.01)
USPC ........................................................ 356/510

(58) Field of Classification Search
CPC ........... G01B 9/02057; G01B 9/02032; G01B 9/02017

USPC ......................................................... 356/510
See application file for complete search history.

(56) References Cited

PUBLICATIONS

Aharonov, Y. et al., "How the result of a measurement of a component of the spin of a spin- 1/2 particle can turn out to be 100," Physical Review Letters, vol. 60, pp. 1351-1354, Apr. 1988.
Aharonov, Y. et al., "A time-symmetric formulation of quantum mechanics," Physics Today, vol. 63, pp. 27-32, Nov. 2010.
Dixon, P. B. et al., "Ultrasensitive beam deflection measurement via interferometric weak value amplification," Physical Review Letters, vol. 102, 173601, 5 pages, Jun. 2009.
Hosten, O. et al., "Observation of the Spin Hall Effect of Light via Weak Measurements," Science, vol. 319, pp. 787-790, Feb. 2008.

(Continued)

*Primary Examiner* — Hwa Lee
(74) *Attorney, Agent, or Firm* — Kilpatrick Townsend and Stockton LLP

(57) ABSTRACT

Systems and method are disclosed for measuring small angular deflections of a target using weak value amplification. A system includes a beam source, a beam splitter, a target reflecting surface, a photodetector, and a processor. The beam source generates an input beam that is split into first and second beams by the beam splitter. The first and second beams are propagated to the target reflecting surface, at least partially superimposed at the target reflecting surface, and incident to the target reflecting surface normal to the target reflecting surface. The first beam is reflected an additional even number of times during propagation to the photodetector. The second beam is reflected an additional odd number of times during propagation to the photodetector. The first and second beams interfere at the photodetector so as to produce interference patterns. The interference patterns are interpreted to measure angular deflections of the target reflecting surface.

20 Claims, 4 Drawing Sheets

(56) References Cited

PUBLICATIONS

Howell, J. C. et al., "Interferometric weak value deflections: quantum and classical treatments," Phys. Rev. A., vol. 81, 033813, 4 pages, Jun. 2009.

Ritchie, N. W. M. et al., "Realization of a measurement of a 'weak value'," Physical Review Letters, vol. 66, pp. 1107-1110, Mar. 1991.

Schlamminger, S. et al., "Test of the equivalence principle using a rotating torsion balance," Physical Review Letters, vol. 100, 041101, 4 pages, 2008.

Starling, D. J. et al., "Optimizing the signal to noise ratio of a beam deflection measurement with interferometric weak values," Phys. Rev. A, vol. 80, 041803, 5 pages, Oct. 2009.

Smith, G. L. et al., "Short-range tests of the equivalence principle," Phys. Rev. D., vol. 61, 022001, 20 pages, Dec. 1999.

Steinberg, A. M., "Quantum measurement: A light touch," Nature, vol. 463, pp. 890-891, Feb. 2010.

Turner, M. D. et al., "Picoradian deflection measurement with an interferometric quasi-autocollimator using weak value amplification," Optics Letters, vol. 36, 3 pages, Mar. 2011.

INTERFEROMETRIC QUASI-AUTOCOLLIMATOR

CROSS-REFERENCES TO RELATED APPLICATIONS

This application claims the benefit under 35 U.S.C. §119 (e) of U.S. Provisional Patent Application No. 61/454,915 filed Mar. 21, 2011, the full disclosure of which is incorporated herein by reference.

STATEMENT AS TO RIGHTS TO INVENTIONS MADE UNDER FEDERALLY SPONSORED RESEARCH AND DEVELOPMENT

This invention was made with government support under NNX08AY66G awarded by the NASA Goddard Flight Center and, PHY0653863 and PHY0969199 awarded by the National Science Foundation. The government has certain rights in the invention.

BACKGROUND

Measuring small angular deflections quickly, precisely, and accurately is an important capability that can be used in many areas. For example, such a capability is important in many fields of experimental physics. As a specific example, in the Eot-Wash experimental gravity group at the University of Washington, torsion balance experiments have been conducted that depend on the ability to measure minuscule angular deflections. (see, e.g., S. Schlamminger, K. Y. Choi, T. A. Wagner, J. H. Gundlach, and E. G. Adelberger, "Test of the equivalence principle using a rotating torsion balance," Phys. Rev. Lett. 100, 041101 (2008); and G. L. Smith, C. D. Hoyle, J. H. Gundlach, E. G. Adelberger, B. R. Heckel, and H. E. Swanson, "Short-range tests of the equivalence principle," Phys. Rev. D 61, 022001 (1999)).

The most commonly used device for measuring small angular deflections is an optical autocollimator. An optical autocollimator collimates the light of a point source using a collimating lens, reflects the collimated light off a target mirror, and then focuses the reflected light onto a position-sensitive photodetector using the collimating lens. Autocollimators are insensitive to displacements of the target, eliminate the effect of optical aberrations in the lens, and average over the reflecting surface of the target. Angular deflection measurements can also be made by a homodyne interferometer, which compares the path length of beams incident on two separate locations on the target.

While existing autocollimators can have a sensitivity of approximately 1 nrad/$\sqrt{Hz}$, devices with even greater sensitivity that are insensitive to displacements of the target are desirable.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Devices and methods are disclosed that employ weak value amplification to measure small angular deflections of a target. In many embodiments, the angular measurements are insensitive to translations of the target. Sensitivities of better than 10 picoradians per root hertz between 10 and 200 hertz have been demonstrated.

Thus, in one aspect, a method for measuring angular deflections of a target is disclosed. The method includes splitting an input electromagnetic beam into a first beam and a second beam. Each of the first and second beams is then propagated to a target reflecting surface and is incident on the target reflecting surface approximately normal to the reflecting surface. The first and second beams are at least partially superimposed at the target reflecting surface. Each of the reflected first and second beams is then propagated to a position-sensitive photodetector. The reflected first beam is reflected an even number of times during its propagation from the target reflecting surface to the position-sensitive photodetector. The reflected second beam is reflected an odd number of times during its propagation from the target reflecting surface to the position-sensitive photodetector. The first and second beams interfere at the position-sensitive photodetector so as to produce interference patterns. The interference patterns are interpreted to determine angular deflections of the target reflecting surface.

In another aspect, a system for measuring angular deflections of a target is disclosed. The system includes an electromagnetic beam source, a beam splitter, a target reflecting surface, a position-sensitive photodetector, and a processor. The electromagnetic beam source generates an input electromagnetic beam, which is split into a first beam and a second beam by the beam splitter. Each of the first and second beams is then propagated to a target reflecting surface and is incident on the target reflecting surface approximately normal to the reflecting surface. The first and second beams are at least partially superimposed at the target reflecting surface. Each of the reflected first and second beams is then propagated to a position-sensitive photodetector. The reflected first beam is reflected an even number of times during its propagation from the target reflecting surface to the position-sensitive photodetector. The reflected second beam is reflected an odd number of times during its propagation from the target reflecting surface to the position-sensitive photodetector. The first and second beams interfere at the position-sensitive photodetector to produce interference patterns. The position-sensitive photodetector generates an output signal in response to the first and second beams and the interference patterns. The processor receives the output signal and is configured to process the output signal to determine angular deflections of the target reflecting surface by interpreting the interference patterns.

For a fuller understanding of the nature and advantages of the present invention, reference should be made to the ensuing detailed description and accompanying drawings.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Small Angle Measurement Using Weak Value Amplification

Weak value amplification is believed to be first posited by Aharonov et al. in 1988. (see, Y. Aharonov, D. Z. Albert, and L. Vaidman, "How the result of a measurement of a component of the spin of a spin-1/2 particle can turn out to be 100," Physical Review Letters 60, 1351-1354 (1988)). Using weak value amplification, the value of a measurement can be effectively amplified by suitable pre-selection and post-selection relating to particles used to make the measurement. A weak value measurement consists of a pre-selection of a certain quantum state; an interaction with the system to be measured, which entangles the state of the particles with one of their continuous degrees of freedom; and a post-selection on a different state. The measurement is made "weak" by requiring that the direct result of each interaction, as measured in the continuous degree of freedom, be smaller than the uncertainty in that degree of freedom. By making the pre-selection and post-selection states nearly orthogonal, the effect of the interaction, as observed in the selected degree of freedom after post-selection, can be greatly amplified. The amplification, however, comes at the cost of a decreased sample size—the number of post-selected particles is inversely proportional to the square of the amplification factor.

Experimental realization of weak value amplification was demonstrated by Ritchie et al. in 1991. (see, N. W. M. Ritchie, J. G. Story, and R. G. Hulet, "Realization of a measurement of a 'weak value'," Phys. Rev. Lett. 66, 1107-1110 (1991)). Weak value amplification has since been used in a number of demonstrations and experiments, including the first measurement of the photonic spin Hall effect. (see, A. M. Steinberg, "Quantum measurement: A light touch," Nature 463, 890-891 (2010); and O. Hosten and P. Kwiat, "Observation of the Spin Hall Effect of Light via Weak Measurements," Science 319, 787-(2008)). Aharonov et al. have suggested a time-symmetric quantum mechanics formalism to simplify the explanation of this and other pre- and post-selection effects. (see, Y. Aharonov, S. Popescu, and J. Tollaksen, "A time-symmetric formulation of quantum mechanics," Physics Today 63, 27-32 (2010)).

Figure 1:
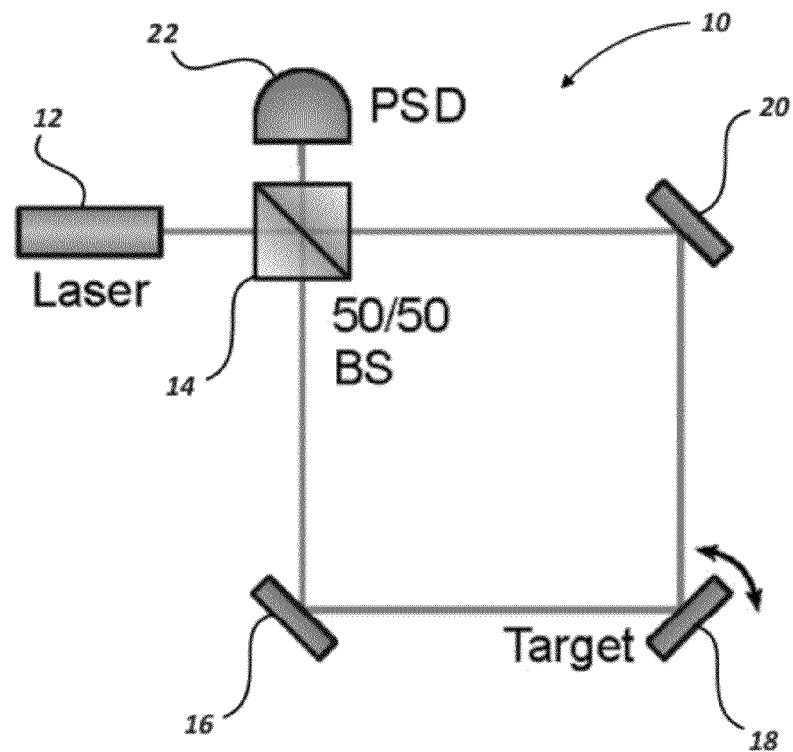
FIG. 1 is a schematic diagram of a device that uses weak value amplification to measure angular deflection.

A recent paper by Dixon et al., of the University of Rochester, describes a device 10 (shown schematically in FIG. 1) that uses weak value amplification to measure angular deflection. (see, P. B. Dixon, D. J. Starling, A. N. Jordan, and J. C. Howell, "Ultrasensitive beam deflection measurement via interferometric weak value amplification," Phys. Rev. Lett. 102, 173601 (2009)). The device 10, referred to herein as the Rochester design, utilizes a Sagnac-interferometer geometry. The device 10 includes a light source 12 (e.g., a laser), a 50/50 beam splitter 14, a first mirror 16, a target mirror 18, a second mirror 20, and a position-sensitive photodetector 22. The introduction of a path-dependent phase offset, via either a half-wave plate and Soliel-Babinet compensator or a small out-of-plane deflection of one of the mirrors (see, D. J. Starling, P. B. Dixon, A. N. Jordan, and J. C. Howell, "Optimizing the signal-to-noise ratio of a beam-deflection measurement with interferometric weak values," Phys. Rev. A 80, 041803 (2009)), allows photons to exit the nominally dark port. In-plane deflections of the target give the exiting photons a path-dependent transverse momentum. For deflections resulting in a transverse momentum smaller than the transverse momentum uncertainty, weak value amplification results in proportional displacements of the beam spot at the dark port. The amount of amplification can be adjusted by varying the phase offset of the two paths.

The Rochester design 10 has the same intrinsic quantum noise (i.e. photon shot noise) limit as an autocollimator, as explained by Starling et al. (see, D. J. Starling, P. B. Dixon, A. N. Jordan, and J. C. Howell, "Optimizing the signal-to-noise ratio of a beam-deflection measurement with interferometric weak values," Phys. Rev. A 80, 041803 (2009)). An autocollimator achieves its reduced quantum noise, as compared to a simple beam-deflection setup, because the size of the beam spot on the detector is reduced by focusing the beam. The enhanced signal-to-quantum-noise ratio of the Rochester design 10, however, results from amplification of the signal. Thus the ratio of the signal to technical noise (e.g., electronic or digitization noise) is also enhanced. The Rochester design 10 has two other specific advantages over an autocollimator. The Rochester design 10 is size-independent—the beam spot displacement and device sensitivity do not depend on the size of the setup. Additionally, the number of photons incident on the detector for a given signal-to-quantum-noise ratio is reduced, allowing for the use of low-saturation-intensity detectors. A homodyne interferometer has the same intrinsic quantum noise limit as an autocollimator and the Rochester design (see, J. C. Howell, D. J. Starling, P. B. Dixon, P. K. Vudyasetu, and A. N. Jordan, "Interferometric weak value deflections: Quantum and classical treatments," Phys. Rev. A 81, 033813 (2010)), but the Rochester design 10 is less sensitive to optical-path-length fluctuation and uses a position-based, rather than intensity-based, measurement.

The Rochester design, however, when used to monitor a torsion balance, may measure angular deflection less accurately than existing autocollimators. A torsion balance, besides being free to rotate about the axis of the torsion fiber, also swings. If the Rochester design were used to monitor a torsion balance, displacements normal to the mirror surface would result in equal displacements (multiplied by $\sqrt{2}$) of the laser spot on the detector. Such displacements would be indistinguishable from rotation of the pendulum. Despite the implementation of swing-damping techniques, torsion pendulums can have displacement noise amplitudes of about 5 μm, which would limit angular measurement accuracy using the Rochester design to sensitivities well above those available with existing autocollimators.

Interferometric Quasi-Autocollimator

As disclosed herein, an interferometric Quasi-Autocollimator (iQuAC) has been developed. The iQuAC is configured to employ weak value amplification in the measurement of small angles while being configured to be insensitive to translations and out-of-plane angular displacements of the target mirror. In order for the iQuAC to be insensitive to target displacements, the laser beams are oriented to be approximately normal to the reflecting target surface. This requires an extra degree of freedom relative to the two paths of the Rochester design. The extra degree of freedom is provided by manipulating the polarization of the beams.

Figure 2:
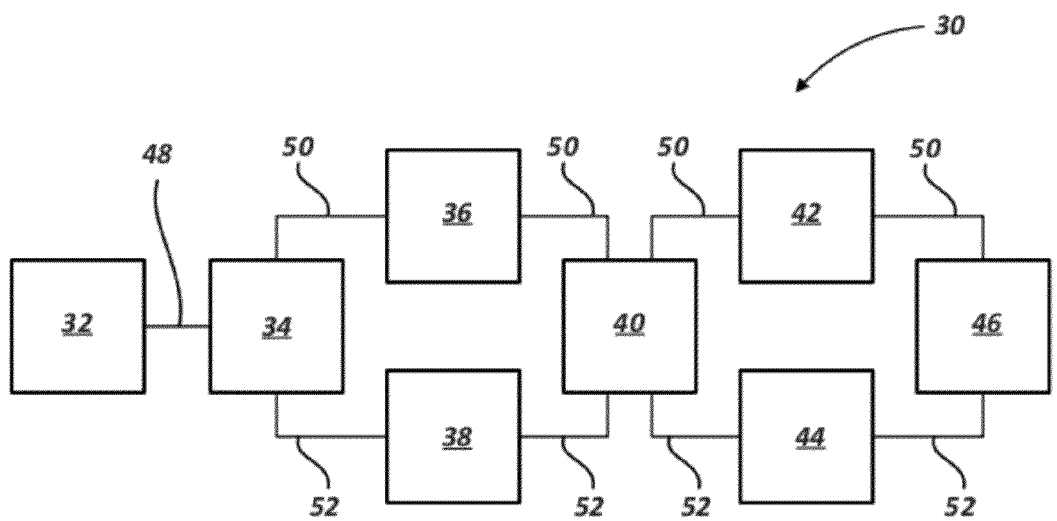
FIG. 2 is a simplified schematic diagram of an interferometric quasi-autocollimator (iQuAC), in accordance with many embodiments, which uses weak value amplification to measure angular deflection and is insensitive to translations and out-of-plane displacements of a target mirror.

FIG. 2 is a simplified schematic diagram of an iQuAC 30, in accordance with many embodiments. The iQuAC 30 includes an electromagnetic beam source 32, a beam splitter 34, a first propagation path first portion 36, a second propagation path first portion 38, a target reflecting surface 40, a first propagation path second portion 42, a second propagation path second portion 44, and a position-sensitive photodetector 46. The electromagnetic beam source 32 generates an input electromagnetic beam 48. The input beam 48 is split into a first beam 50 and a second beam 52. The first beam 50 is propagated from the beam splitter 34 to the target reflecting surface 40 over the first propagation path first portion 36. The second beam 52 is propagated from the beam splitter 34 to the target reflecting surface over the second propagation path first portion 38. In many embodiments, each of the first and second beams 50, 52 is incident on the target reflecting surface 40 approximately normal to the target reflecting surface 40. In many embodiments, the first propagation path first portion 36 and the second propagation path first portion 38 are configured such that the first and second beams 50, 52 are incident on the target reflecting surface 40 at substantially the same location on the target reflecting surface 40.

After being reflected from the target reflecting surface 40, the first and second beams 50, 52 are propagated to the position-sensitive photodetector 46 over different propagation paths. The reflected first beam 50 is propagated from the target reflecting surface 40 to the position-sensitive photodetector 46 over the first propagation path second portion 42. The reflected second beam 52 is propagated from the target reflecting surface 40 to the position-sensitive photodetector 46 over the second propagation path second portion 44. Along the first propagation path second portion 42, the first beam 50 is reflected an even number of times. Along the second propagation path second portion 44, the second beam 52 is reflected an odd number of times. The difference in the number of reflections results in the first and second beams 50, 52 having opposite in-plane transverse momentum at the position-sensitive photodetector 46. The first and second beams 50, 52 interfere at the position-sensitive photodetector 46 so as to produce interference patterns. The interference patterns are interpreted to determine angular deflections of the target reflecting surface 40. The position-sensitive photodetector 46 generates an output signal in response to the first and second beams 50, 52 and the interference patterns. The output signal of the position-sensitive photodetector 46 is the processed to determine angular deflections of the target reflecting surface 40 by interpreting the interference patterns.

Figure 3:
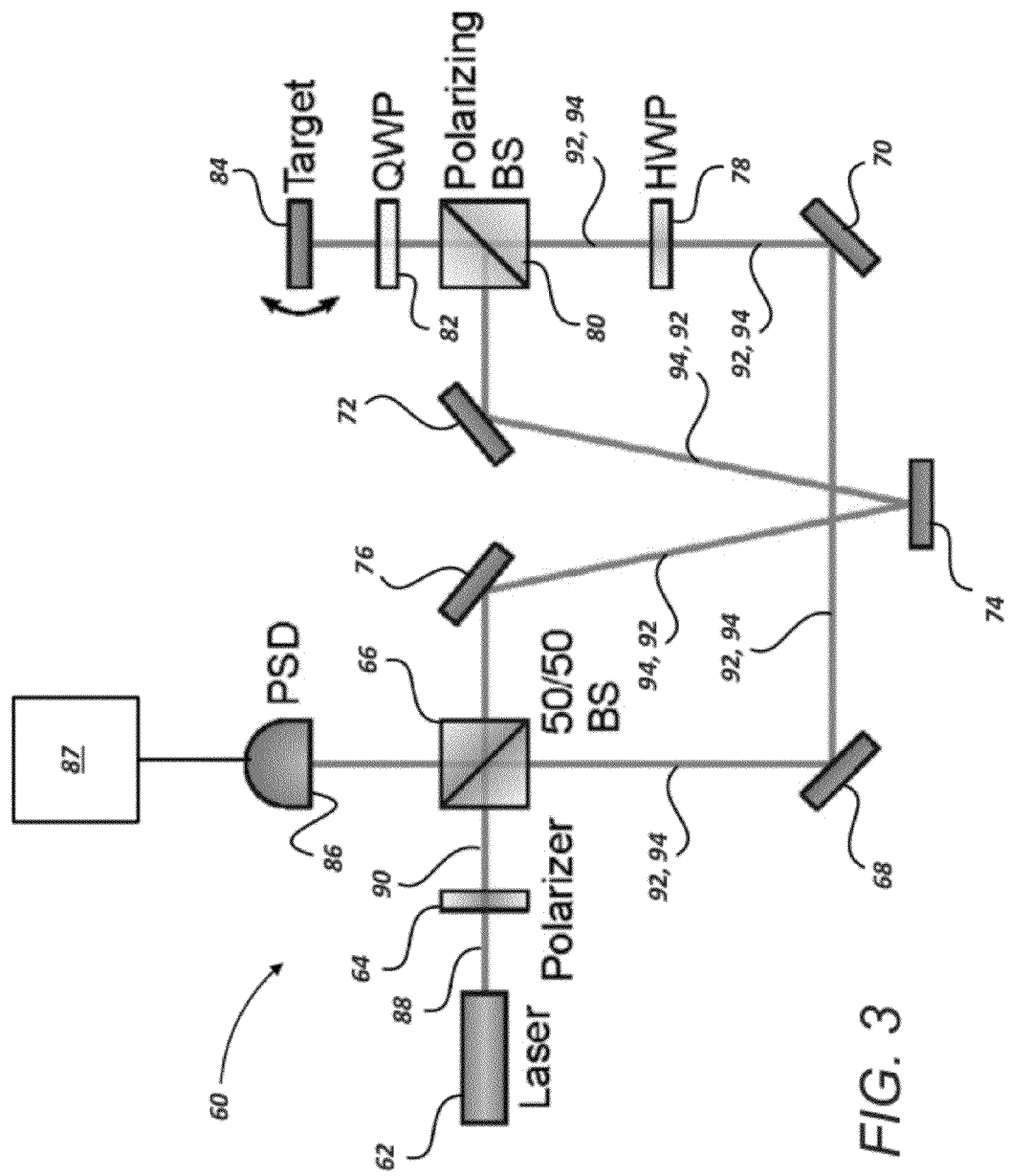
FIG. 3 is a schematic diagram of an iQuAC, in accordance with many embodiments.

FIG. 3 shows a schematic representation of an iQuAC 60, which is but one of many possible suitable embodiments of an iQuAC. The iQuAC 60 includes a light source 62 (e.g., laser), a polarizer 64, a 50/50 beam splitter 66, non-target mirrors 68, 70, 72, 74, 76, a half-wave plate 78, a polarizing beam splitter 80, a quarter-wave plate 82, a target mirror 84, a position-sensitive photodetector 86, and a processor 87. The processor 87 receives an output signal from the position-sensitive photodetector 86 and processes the output signal to determine angular deflections of the target mirror 84.

In the iQuAC 60, an input light beam 88 output from the light source 62 passes through the polarizer 64 to be polarized into a polarized input light beam 90. The beam splitter 66 splits the polarized input light beam 90 into a first beam 92 and a second beam 94. The first beam 92 then reflects off two non-target mirrors 68, 70 and passes through the half-wave plate 78. The half-wave plate 78 rotates the polarization of the first beam 92 by 90 degrees, allowing the first beam 92 to pass through the polarizing beam splitter 80. The first beam 92 then passes through the quarter-wave plate 82, reflects off the target mirror 84, and returns through the quarter-wave plate 82. The two passes through the quarter-wave plate 52 rotate the polarization of the first beam 92 by another 90 degrees, causing the first beam 92 to reflect off the polarizing beam splitter 80. The first beam 92 is reflected by three non-target mirrors 72, 74, 76 and is returned to the 50/50 beam splitter 66. The second beam 94 that initially passes through the 50/50 beam splitter 36 follows the above-described first beam 92 path in reverse. The first and second beams 92, 94 are at least partially superimposed at the target reflecting surface 84. An intentional slight out-of-plane misalignment of one of the non-target mirrors 68, 70, 72, 74, 76 allows for some light to exit the nominally dark port of the iQuAC 60 due to the resulting difference in path lengths. An in-plane rotation of the target mirror 84 results in a displacement of the beam spot at the dark port, and the magnitude of the out-of-plane misalignment controls the weak value amplification factor of the displacement. The mirror arrangement in the iQuAC 60 is such that the two paths between the two beam splitters 66, 80 are of equal length. The target mirror 84 is fixed in the center of both paths between the light and dark ports. By orienting the light paths to be substantially perpendicular to the target mirror 84, the effects of angular induced out-of-plane displacements of the target mirror 84 are mitigated. To allow the weak value amplification to occur, the number of reflections in each path is such that one path has an even number of reflections after the target mirror and the other path has an odd number, resulting in the light from the two paths having opposite in-plane transverse momentum when exiting the dark port. The first and second beams 92, 94 interfere at the position-sensitive photodetector 86 so as to produce interference patterns. The interference patterns are interpreted to determine angular deflections of the target mirror 84.

Howell et al. have provided the mathematical quantum-mechanical and classical derivation of the weak value amplification scheme used by both the Rochester design 10 and the iQuAC 60. (see, J. C. Howell, D. J. Starling, P. B. Dixon, P. K. Vudyasetu, and A. N. Jordan, "Interferometric weak value deflections: Quantum and classical treatments," Phys. Rev. A 81, 033813 (2010)). The classical description can also be explained in conceptual terms. Suppose a spatially-uniform coherent source is directed into the iQuAC 60. If the system were to be exactly aligned with zero phase offset between the two paths, complete destructive interference would occur at the dark port. If the target were to be rotated in plane, a series of equally spaced fringes, oriented perpendicular to the plane of the apparatus, would appear. The center point would have zero intensity, and the fringe spacing would be inversely proportional to the angle of the target. The introduction of a phase offset between the two paths would result in the fringe pattern being displaced by the same phase, regardless of the fringe spacing (or angle of the target), so that the intensity of the center point is the same for any angular displacement of the target.

Figure 4A:
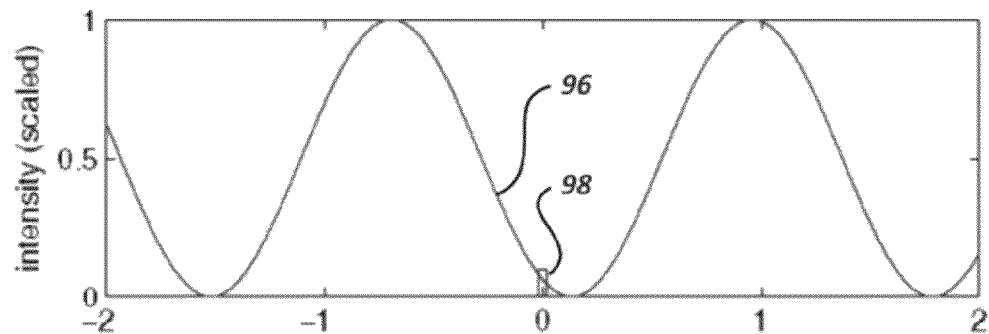
FIG. 4A shows an example of a fringe pattern that would result from a spatially uniform source being directed into an iQuAC, in accordance with many embodiments, in which the central minimum is shifted due to a phase offset between beam paths of the iQuAC.

FIG. 4A shows an example fringe pattern 96 that can result from a spatially uniform source being directed into the iQuAC 60. The central minimum is shifted due to a phase offset between the two propagation paths for the first and second beams 92, 94.

Now suppose that a Gaussian-profile source is used. The fringe pattern would still be present but multiplied by the beam profile. For sufficiently small angular deflections, the fringe spacing would be large compared to the width of the beam, and the fringe pattern in the region of the beam spot could be approximated by a linear function. A linear function of a small slope multiplied by a zero-centered Gaussian is approximately equal to a Gaussian of equal width that has been translated by some distance. For example, for $b\sigma \ll a$, $$(a+bx)\exp[-x^2/(2\sigma^2)] \approx a\exp\left\{\frac{-[x-b\sigma^2/a]^2}{2\sigma^2}\right\}. \quad \text{Equation (1)}$$

For sufficiently wide fringe spacing (or small angular deflections), the fringe pattern in the region of the Gaussian can be approximated by the linear function $\sin^2(\emptyset/2)-2k_0\theta x \sin\emptyset$, where $\emptyset$ is the phase offset, $k_0$ the wave number, $\theta$ the angular deflection of the target, and x the transverse position. Replacing the values in (1) and approximating for small values of $\emptyset$ gives a translation of $8k_0\sigma^2\theta/\emptyset$. This result corresponds to an amplification, as compared to a simple beam-deflection setup with target-detector separation $l_{td}$, of $4k_0\sigma^2/(\emptyset l_{td})$, and matches the result of Howell et al.

Figure 4B:
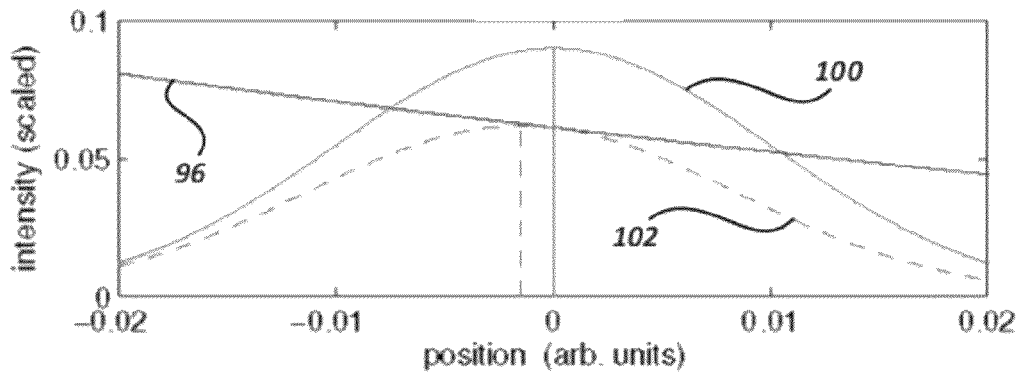
FIG. 4B shows a portion of the fringe pattern of FIG. 4A that is denoted by the box, an example Gaussian profile, and a result of multiplying the Gaussian profile with the fringe pattern portion, in accordance with many embodiments.

FIG. 4B shows a representation of the multiplication of the fringe pattern 96 with a Gaussian profile. A portion of the fringe pattern 96 denoted by a box 98 in FIG. 4A is shown along with an example Gaussian profile 100. The result of multiplying the Gaussian profile 100 with the fringe pattern 96 results in a shifted Gaussian profile 102. (The Gaussian profile 100 has been scaled for clarity).

In many embodiments, the fringe spacing is much wider than the widths of the first and second beams 92, 94 so that the interference pattern incident on the position-sensitive photodetector 86 is reduced to a single beam spot (see, e.g., the portion of the interference pattern as shown in FIG. 4B). The position-sensitive photodetector 86 measures the location of this single beam spot. Due to the interference between the first and second beams 92, 94, the target reflecting surface angle induced displacement of this single beam spot, which results from the interaction between (superposition of) the first and second beams 92, 94, is greater than the displacement of a beam spot that would be induced by the angle of the target reflecting surface in the absence of the interaction between the first and second beams 92, 94.

Example iQuAC

Figure 5:
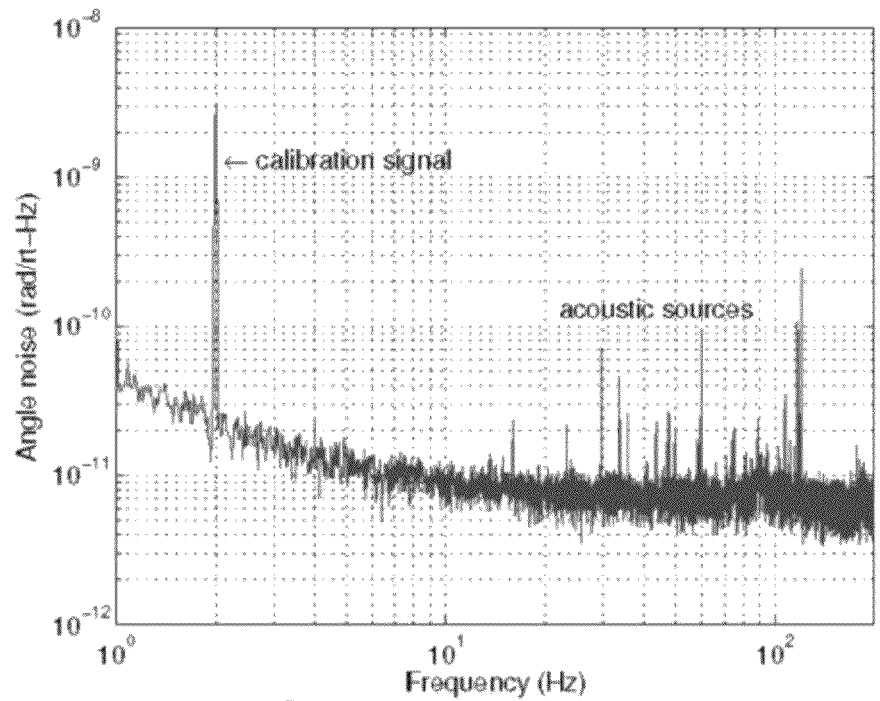
FIG. 5 is a plot of a noise floor of a prototype iQuAC, in accordance with many embodiments.

A prototype iQuAC 60 was constructed using a 10-mW, 660-nm diode laser 62 connected via a single-mode fiber to a 3.4-mm diameter collimator, standard optics, and a 5-mm position-sensitive photodetector 86. The signal from the position-sensitive photodetector 86 is amplified, low-passed, and then digitized and read using a data-acquisition board. An actuator (e.g., a piezoelectric disk connected to a signal generator) is used to generate known in-plane angular displacements of one of the non-target mirrors 68, 70, 72, 74, 76 at a known frequency. The iQuAC 60 can be calibrated by removing the 50/50 beam splitter 66 and making a simple beam-deflection measurement. A 2-Hz sine wave voltage signal is applied to the piezoelectric disk and used as a calibration signal to determine the weak value amplification factor. A noise plot from the prototype iQuAC 60 is shown in FIG. 5. A noise floor is observed of less than 10 prad/$\sqrt{Hz}$ in the 10-200 Hz band. Below 10 Hz, 1/f noise dominates, and above 200 Hz, acoustic pickup increases. Sensitivities below 10 prad/$\sqrt{Hz}$ have been demonstrated. A 620-prad calibration signal is visible at 2 Hz. A weak value amplification factor of 60, as compared to a beam-deflection measurement, was measured for this data.

The ability to calibrate the iQuAC 60 allows for dynamic changes of the weak value amplification factor via changing the phase offset between the first and second beams 92, 94 at the position-sensitive photodetector 86. The ability to change the weak value amplification factor allows for changing the angular range of the instrument (with a proportional effect on resolution) to suit the measurement being made.

Exemplary Methods

Figure 6:
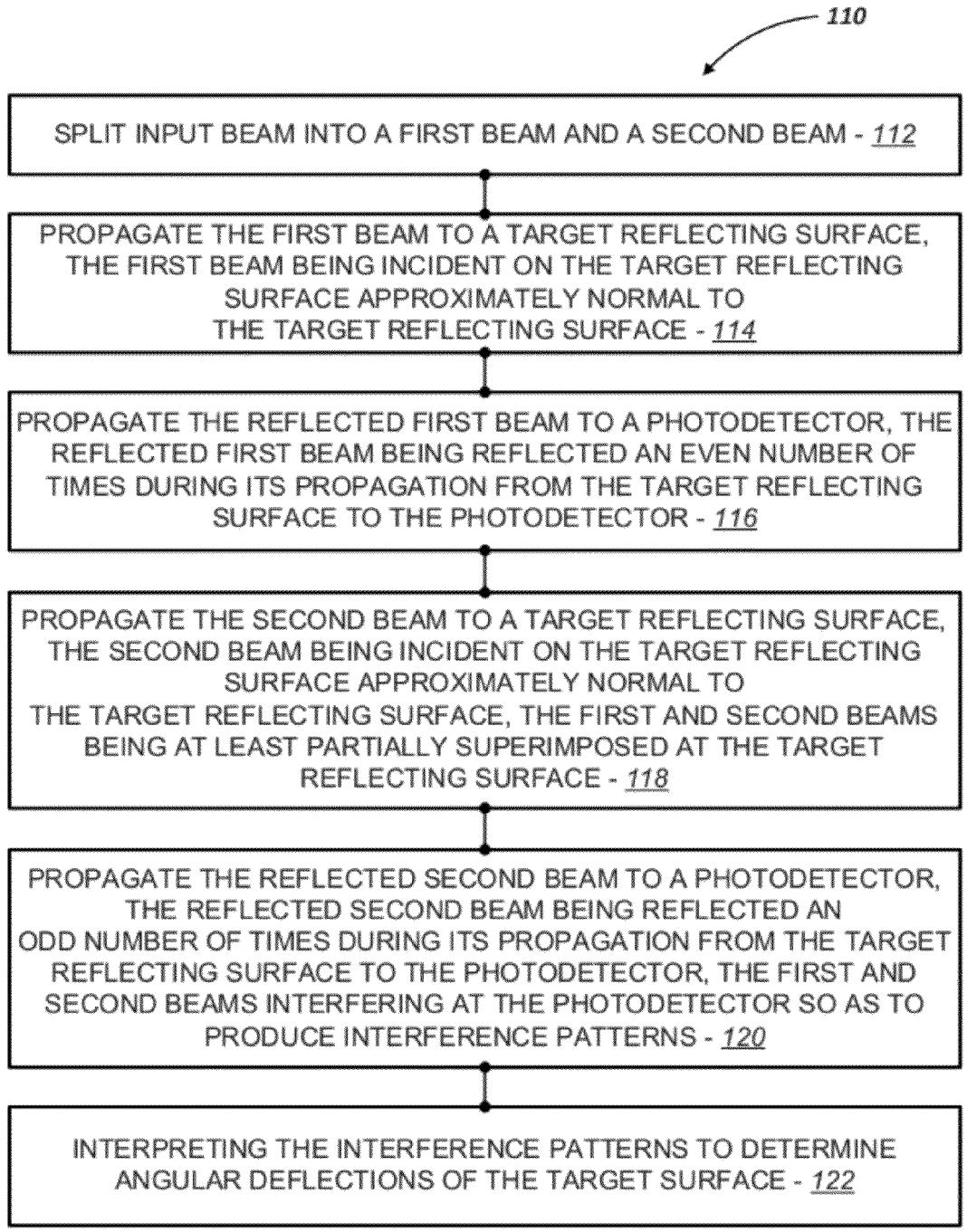
FIG. 6 is a simplified block diagram of a method, in accordance with many embodiments, for using weak value amplification to measure angular deflections of a target.

FIG. 6 is a simplified block diagram of a method 110, in accordance with many embodiments, for using weak value amplification to measure angular deflections of a target. The iQuACs described herein can be used to practice the method 110.

In act 112, an input electromagnetic beam is split into a first beam and a second beam. The location of the splitting defines a first position for the following discussion of propagation paths.

In act 114, the first beam is propagated along a first portion of a first propagation path. The first portion of the first propagation path extends from the first position to a reflecting surface of a target. The first beam is incident on the target reflecting surface approximately normal to the target reflecting surface and reflects from the target reflecting surface.

In act 116, the reflected first beam is propagated along a second portion of the first propagation path. The second portion of the first propagation path extends from the target reflecting surface to a position-sensitive photodetector. The first beam is reflected an even number of times during its propagation along the second portion of the first propagation path.

In act 118, the second beam is propagated along a first portion of a second propagation path. The first portion of the second propagation path extends from the first position to the reflecting surface of a target. The second beam is incident on the target reflecting surface approximately normal to the target reflecting surface and reflects from the target reflecting surface. The first and second beams are at least partially superimposed at the target reflecting surface.

In act 120, the reflected second beam is propagated along a second portion of the second propagation path. The second portion of the second propagation path extends from the target reflecting surface to the position-sensitive photodetector. The second beam is reflected an odd number of times during its propagation along the second portion of the second propagation path. The first and second beams interfere at the position-sensitive photodetector so as to produce interference patterns.

In act 122, the interference patterns are interpreted to determine angular deflections of the target reflecting surface.

In many embodiments, the first and second propagation paths coincide. And the first and second beams propagate along the coinciding first and second propagation paths in opposite directions.

In many embodiments, selective polarization can be used to route the first and second beams along their respective propagation paths. For example, the method can further include polarizing the input electromagnetic beam prior to being split into the first and second beams. The polarity of one of the first and second beams can be rotated by 90 degrees during its propagation along the first portion of its respective propagation path. Each of the first and second beams can be passed through a polarizing beam splitter during its propagation along the first portion of its respective propagation path to direct each of the first and second beams toward the target reflecting surface. Each of the first and second beams can be passed through a quarter-wave plate twice to rotate the polarity of each of the first and second beams by 90 degrees. In many embodiments, the quarter-wave plate is located between the polarizing beam splitter and the target reflecting surface. And each of the first and second beams can be passed through the polarizing beam splitter during its propagation along the second portion of its respective propagation path to direct each of the first and second beams along the remainder of the second portion of its respective propagation path.

In many embodiments, non-target mirrors are used to reflect each of the first and second beams along its respective propagation path. An out-of-plane misalignment of at least one of the target mirrors can be used to generate a difference in path length between the first and second propagation paths.

In many embodiments, the input electromagnetic beam has a Gaussian profile. For example, the first and second propagation paths can be coplanar and the input electromagnetic beam can have an elliptical Gaussian profile that is elongated in-plane with the first and second propagation paths.

In many embodiments, the act of interpreting the interference patterns to determine angular deflections of the target reflecting surface includes determining a beam spot displacement for one of the interference patterns and calculating an angle of the target reflecting surface. The calculated angle of the target reflecting surface is proportional to the beam spot displacement and inversely proportional to a weak value amplification factor that is based at least partially on a phase offset between the first and second beams at the position-sensitive photodetector.

The systems and methods described herein can be used in any suitable angle measurement device. For example, the systems and methods described herein can be used in angle measurement devices used for alignment and/or monitoring of equipment, including but not limited to scientific equipment, industrial equipment, and consumer products.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for measuring angular deflections of a target, the method comprising:

splitting an input electromagnetic beam into a first beam and a second beam, the location of the splitting defining a first position;

propagating the first beam along a first portion of a first propagation path, the first portion of the first propagation path extending from the first position to a reflecting surface of a target, the first beam being incident on the target reflecting surface approximately normal to the target reflecting surface and reflecting from the target reflecting surface;

propagating the reflected first beam along a second portion of the first propagation path, the second portion of the first propagation path extending from the target reflecting surface to a position-sensitive photodetector, the first beam being reflected an even number of times during its propagation along the second portion of the first propagation path;

propagating the second beam along a first portion of a second propagation path, the first portion of the second propagation path extending from the first position to the target reflecting surface, the second beam being incident on the target reflecting surface approximately normal to the target reflecting surface and reflecting from the target reflecting surface, the first and second beams being at least partially superimposed at the target reflecting surface;

propagating the reflected second beam along a second portion of the second propagation path, the second portion of the second propagation path extending from the target reflecting surface to the position-sensitive photodetector, the second beam being reflected an odd number of times during its propagation along the second portion of the second propagation path, the first and second beams interfering at the position-sensitive photodetector so as to produce interference patterns;

interpreting the interference patterns to determine angular deflections of the target reflecting surface.

2. The method of claim 1, wherein:
the first and second propagation paths coincide; and
the first and second beams propagate along the coinciding first and second propagation paths in opposite directions.

3. The method of claim 2, further comprising:
polarizing the input electromagnetic beam prior to being split into the first and second beams;
rotating the polarity of one of the first and second beams by 90 degrees during its propagation along the first portion of its respective propagation path;
passing each of the first and second beams through a polarizing beam splitter during its propagation along the first portion of its respective propagation path to direct each of the first and second beams toward the target reflecting surface;
passing each of the first and second beams through a quarter-wave plate twice to rotate the polarity of each of the first and second beams by 90 degrees, the quarter-wave plate being located between the polarizing beam splitter and the target reflecting surface; and
passing each of the first and second beams through the polarizing beam splitter during its propagation along the second portion of its respective propagation path to direct each of the first and second beams along the remainder of the second portion of its respective propagation path.

4. The method of claim 3, wherein:
non-target mirrors are used to reflect each of the first and second beams along its respective propagation path; and
an out-of-plane misalignment of at least one of the target mirrors is used to generate a difference in path length between the first and second propagation paths.

5. The method of claim 1, wherein the input electromagnetic beam has a Gaussian profile.

6. The method of claim 1, wherein the input electromagnetic beam has an elliptical Gaussian profile that, when incident upon the position-sensitive photodetector, is elongated along an axis of interest on the position-sensitive photodetector.

7. The method of claim 1, wherein said interpreting the interference patterns to
determine angular deflections of the target reflecting surface comprises:
determining a beam spot displacement for one of the interference patterns; and
calculating an angle of the target reflecting surface, the angle of the target reflecting surface being proportional to the beam spot displacement and inversely proportional to a weak value amplification factor that is based at least partially on a phase offset between the first and second beams at the position-sensitive photodetector.

8. The method of claim 7, further comprising changing the weak value amplification factor by changing the phase offset.

9. The method of claim 1, wherein the input electromagnetic beam consists of a single wavelength.

10. A system for measuring angular deflections of a target, the system comprising:
an electromagnetic beam source configured to generate an input electromagnetic beam;
a beam splitter configured to split the input electromagnetic beam into a first beam and a second beam;
a target reflecting surface, the first beam propagating from the beam splitter to the target reflecting surface along a first portion of a first propagation path, the second beam propagating from the beam splitter to the target reflecting surface along a first portion of a second propagation path, each of the first and second beams being incident on the target reflecting surface approximately normal to the target reflecting surface and reflecting from the target reflecting surface, the first and second beams being at least partially superimposed at the target reflecting surface;
a position-sensitive photodetector, the first beam reflected from the target reflecting surface propagating to the position-sensitive photodetector along a second portion of the first propagation path, the first beam being reflected an even number of times during its propagation along the second portion of the first propagation path, the second beam reflected from the target reflecting surface propagating to the position-sensitive photodetector along a second portion of the second propagation path, the second beam being reflected an odd number of times during its propagation along the second portion of the second propagation path, the first and second beams interfering at the position-sensitive photodetector to produce interference patterns, the position-sensitive photodetector generating an output signal in response to the first and second beams and the interference patterns; and
a processor receiving the output signal and being configured to process the output signal to determine angular deflections of the target reflecting surface by interpreting the interference patterns.

11. The system of claim 10, wherein:
the first and second propagation paths coincide; and
the first and second beams propagate along the coinciding first and second propagation paths in opposite directions.

12. The system of claim 11, further comprising:
a polarizer disposed between the electromagnetic beam source and the beam splitter to polarize the input electromagnetic beam;
a half-wave plate disposed between the beam splitter and the target reflecting surface along the first portion of one of the first and second propagation paths to rotate the polarity of the respective one of the first and second beams by 90 degrees;
a polarizing beam splitter disposed along the first portions of the first and second propagation paths, each of the first and second beams being passed through the polarizing beam splitter; and
a quarter-wave plate disposed between the polarizing beam splitter and the target reflecting surface, each of the first and second beams being passed through the quarter-wave plate prior to being incident on the target reflecting surface, and each of the first and second beams being passed back through the quarter-wave plate after being reflected from the target reflecting surface.

13. The system of claim 12, wherein a phase offset exists between the first and second beams at the position-sensitive photodetector.

14. The system of claim 12, further comprising non-target mirrors that are used to reflect each of the first and second beams along its respective propagation path.

15. The system of claim 14, wherein at least one of the non-target mirrors is misaligned to at least partially provide the phase-offset.

16. The system of claim 10, wherein the electromagnetic beam source comprises a single wavelength laser.

17. The system of claim 10, wherein the input electromagnetic beam has a Gaussian profile.

18. The system of claim 17, wherein:
the first and second propagation paths are coplanar; and
the input electromagnetic beam has an elliptical Gaussian profile that is elongated in-plane with the first and second propagation paths.

19. The system of claim 10, wherein the processor calculates an angle of the target reflecting surface by determining a beam spot displacement for one of the interference patterns, the angle of the target reflecting surface being proportional to the beam spot displacement and inversely proportional to a weak value amplification factor that is based at least partially on a phase offset between the first and second beams at the position-sensitive photodetector.

20. The system of claim 19, further comprising an actuator operable to rotate a non-target mirror by a predetermined angle at a predetermined frequency, and wherein the processor is configured to determine the weak value amplification factor in response to the output signal generated by said rotation of the non-target mirror.

* * * * *